United States Patent
Deane et al.

(10) Patent No.: US 11,771,213 B2
(45) Date of Patent: Oct. 3, 2023

(54) DETERMINING A POSITION OF AN ORAL CARE DEVICE

(71) Applicant: KONINKLIJKE PHILIPS N.V., Eindhoven (NL)

(72) Inventors: Steven Charles Deane, Cambridge (GB); Felipe Maia Masculo, Eindhoven (NL); Vincent Jeanne, Migne Auxances (FR)

(73) Assignee: KONINKLIJKE PHILIPS N.V., Eindhoven (NL)

(*) Notice: Subject to any disclaimer, the term of this patent is extended or adjusted under 35 U.S.C. 154(b) by 616 days.

(21) Appl. No.: 16/959,854

(22) PCT Filed: Jan. 3, 2019

(86) PCT No.: PCT/EP2019/050052
§ 371 (c)(1),
(2) Date: Jul. 2, 2020

(87) PCT Pub. No.: WO2019/137841
PCT Pub. Date: Jul. 18, 2019

(65) Prior Publication Data
US 2020/0329857 A1   Oct. 22, 2020

Related U.S. Application Data

(60) Provisional application No. 62/615,474, filed on Jan. 10, 2018.

(51) Int. Cl.
*A46B 15/00* (2006.01)
*A61C 17/22* (2006.01)

(52) U.S. Cl.
CPC ...... *A46B 15/0006* (2013.01); *A46B 15/0038* (2013.01); *A61C 17/221* (2013.01); *A46B 2200/1066* (2013.01)

(58) Field of Classification Search
CPC ............ A46B 15/0002; A46B 15/0004; A46B 15/0006; A46B 15/0038; A61C 17/02; A61C 17/221
See application file for complete search history.

(56) References Cited

U.S. PATENT DOCUMENTS

| | | | |
|---|---|---|---|
| 6,766,549 B2 * | 7/2004 | Klupt | A61C 17/28 433/125 |
| 6,884,069 B2 | 4/2005 | Goldman | |

(Continued)

FOREIGN PATENT DOCUMENTS

| | | |
|---|---|---|
| WO | 2014202250 A1 | 12/2014 |
| WO | 201702004 A1 | 1/2017 |

(Continued)

OTHER PUBLICATIONS

International Search Report dated Apr. 16, 2019.

*Primary Examiner* — Laura C Guidotti (57) ABSTRACT

The invention discloses an oral care device (100) comprising a head portion (102) having a protuberance (104) for engaging an interproximal region within an oral cavity. The oral care device (100) also comprises at least one sensor (108) for acquiring motion data for the oral care device, and a processor (110). The processor is configured to determine when the protuberance of the head portion engages an interproximal region in the oral cavity; and determine, based on motion data acquired by the at least one sensor as the protuberance moves between interproximal regions, a position of the head portion of the oral care device in the oral cavity. An oral care system and a method of determining a position of an oral care device in an oral cavity are also disclosed.

15 Claims, 6 Drawing Sheets (56) References Cited

U.S. PATENT DOCUMENTS

| | | | |
|---|---|---|---|
| 10,064,711 B1* | 9/2018 | Richter | A61C 17/221 |
| 10,687,610 B2 | 6/2020 | Jimenez | |
| 2012/0295216 A1 | 11/2012 | Dykes | |
| 2014/0272768 A1 | 9/2014 | Curry et al. | |
| 2015/0127371 A1 | 5/2015 | Dykes | |
| 2016/0331117 A1 | 11/2016 | Follows | |
| 2021/0022840 A1* | 1/2021 | Deane | A61C 15/046 |

FOREIGN PATENT DOCUMENTS

| | | | |
|---|---|---|---|
| WO | 2017068453 A1 | 4/2017 | |
| WO | 2017145033 A1 | 8/2017 | |
| WO | WO 2018/234129 A1 * | 12/2018 | A46B 9/04 |

\* cited by examiner

DETERMINING A POSITION OF AN ORAL CARE DEVICE

This application is the U.S. National Phase application under 35 U.S.C. § 371 of International Application No. PCT/EP2019/050052, filed on Jan. 3, 2019, which claims the benefit of U.S. Provisional Application Ser. No. 62/615,474, filed Jan. 10, 2018. These applications are hereby incorporated by reference herein.

FIELD OF THE INVENTION

The invention relates to an oral care device and, more particularly, to determining a position of an oral care device in an oral cavity of a user.

BACKGROUND OF THE INVENTION

In the field of oral healthcare, it can be useful to be able to determine the location of an oral care device during use. For example, it may be useful to know whether one or more teeth have been missed during brushing and, if so, which teeth have been missed. Similarly, when using a device to detect an oral health problem, such as gingivitis, it is important to know where the device is located within the oral cavity, so that the location of any identified signs of gingivitis can be determined.

Due to the different geometries of individual mouths (e.g. with different numbers and arrangements of teeth), it can be difficult to accurately determine the location of a device using existing methods.

One existing method for determining the location of a device within an oral cavity uses a number of sensors in combination with a high-resolution camera to track the position of the device and the user during use. For example, such a camera may be implemented within a smart mirror (i.e. a mirror with connectivity and other functionality), or the camera may be remote from, but associated with, the oral care device. However, such a system may not be considered desirable due to the potential lack of privacy introduced by using a camera in a bathroom (or other private) environment. Furthermore, such a system may require a user to remain relatively still during the oral care activity (e.g. to remain within the field of view of the camera), thereby restricting the user's freedom to move during the activity.

Existing methods of locating a device in an oral cavity can be used to locate the device to within one of 16 sub-segments of a user's mouth. It is desirable to improve on this accuracy, but such improvements have, so far, proven to be difficult due to the multiple factors that must be taken into account, such as user motion. Thus, it would be desirable to provide a mechanism by which the location of a device within an oral cavity can be determined accurately, and without putting significant constraints on the user.

SUMMARY OF THE INVENTION

There is a desire to be able to accurately determine the position of an oral care device within the oral cavity of a user. For example, it would be useful to be able to determine the location of a device to an accuracy of an individual tooth, or an interproximal region (i.e. the region between two adjacent teeth). To this end, it has been discovered that location information can be determined when a device is caused to engage an interproximal region within an oral cavity.

According to a first aspect, an oral care device comprises a head portion having a protuberance for engaging an interproximal region within an oral cavity; at least one sensor for acquiring motion data for the oral care device; and a processor configured to determine when the protuberance of the head portion engages an interproximal region in the oral cavity; and determine, based on motion data acquired by the at least one sensor as the protuberance moves between interproximal regions, a position of the head portion of the oral care device in the oral cavity.

Some existing oral care devices may include one or more sensors suitable for acquiring motion data. According to embodiments disclosed herein, knowledge of when the device engages an interproximal region may be used along with the motion data to determine the position of the device accurately.

The at least one sensor may comprise at least one of an accelerometer, an orientation sensor and a proximity sensor.

In some embodiments, the at least one sensor may comprise an accelerometer. The processor may be configured to integrate acceleration data from the accelerometer over time to obtain velocity data; and determine when the protuberance engages an interproximal region by detecting a minimum in the velocity data.

The processor may, in some embodiments, be configured to calculate a distance between interproximal regions by integrating the velocity data over time to obtain a distance moved by the protuberance between interproximal regions.

In some embodiments, the at least one sensor may comprise an orientation sensor for determining an orientation of the oral care device relative to the head of the user. The processor may be configured to determine the position of the head portion of the oral care device based on the determined orientation.

In some embodiments, the processor may be configured to determine, from the motion data, a general path around a dental arch within the oral cavity. The processor may be configured to determine when the protuberance engages an interproximal region by detecting movement of the head portion in a direction substantially perpendicular to the general path.

The oral care device may further comprise a user input mechanism. The processor may be configured to determine that the protuberance of the head portion has engaged an interproximal region based on the receipt of a user input via the user input mechanism.

In some embodiments, the oral care device may further comprise a detector for detecting an oral health disorder.

The oral care device may, in some embodiments, comprise a toothbrush, and the head portion of the toothbrush may comprise a plurality of bristles. The protuberance may comprise extended tuft of bristles amongst the plurality of bristles.

In other embodiments, the oral care device may comprise an oral cleaning device configured to direct a flow of fluid from a nozzle of the head portion towards an interproximal region. In such embodiments, the protuberance may comprise the nozzle.

According to a second aspect, a method of determining a position of an oral care device in an oral cavity is provided. The oral care device has a head portion which includes a protuberance for engaging an interproximal region within the oral cavity, and at least one sensor for acquiring motion data for the oral care device. The method comprises determining when the protuberance of the head portion engages an interproximal region in the oral cavity; and determining, based on motion data acquired by the at least one sensor as the protuberance moves between interproximal regions, a position of the head portion of the oral care device in the oral cavity.

In some embodiments, the method may further comprise calculating a distance between interproximal regions; comparing the calculated distant between interproximal regions with a previously-calculated distance between the same interproximal regions; generating an alert signal if it is determined that the compared distances differ by more than a threshold amount.

The method may further comprise applying a statistical model to the motion data prior to determining that the protuberance of the head portion has engaged an interproximal region.

According to a third aspect, an oral care system is provided. The oral health system comprises an oral care device and processing circuitry. The oral care device includes a head portion which includes a protuberance for engaging an interproximal region within an oral cavity; and at least one sensor for acquiring motion data for the oral care device. The processing circuitry is configured to determine when the protuberance of the head portion engages an interproximal region in the oral cavity; and determine, based on motion data acquired by the at least one sensor as the protuberance moves between interproximal regions, a position of the head portion of the oral care device in the oral cavity.

The oral care system may, in some embodiments, further comprise a detector for measuring movement of the head of the user relative to the oral care device. The processing circuitry may be configured to calculate a distance between adjacent interproximal regions based at least in part on the measured movement.

These and other aspects of the invention will be apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF EMBODIMENTS

Embodiments disclosed herein are concerned with determining the location of an oral care device within an oral cavity of a user. Specifically, embodiments determine when the device is located at, passes by, or engages an interproximal region. As used herein, the term interproximal region is considered to include the space, or volume, between two adjacent teeth. A device is considered to engage an interproximal region when at least part of the device is moved into the interproximal region, or comes into contact with a surface (e.g. a surface of a tooth or a gum) within the interproximal region.

The relative positions of interproximal regions within an oral cavity may be determined, and it may be possible to determine precisely which interproximal region is being, or has been, engaged by the device.

Figure 1:
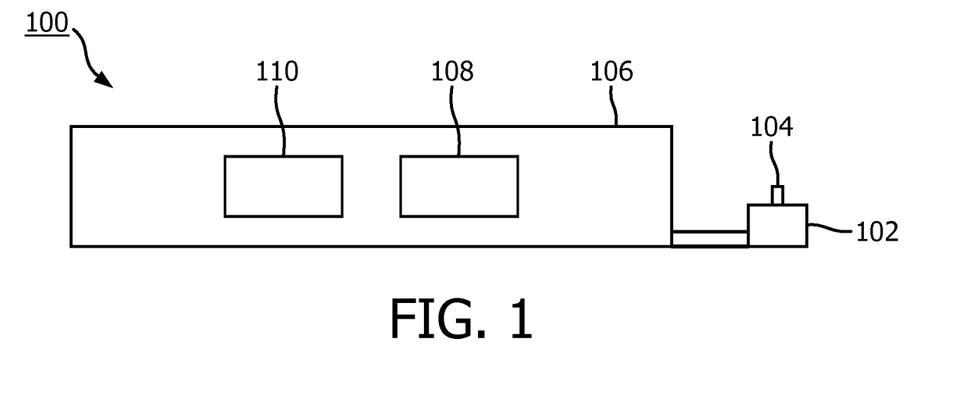
FIG. 1 is a simplified schematic of an example of an oral care device.

Referring to the drawings, FIG. 1 is a simplified schematic of an oral care device 100. The oral care device 100 may comprise any type of device for use in oral care activities. For example, the oral care device 100 may comprise a power toothbrush, an oral cleaning tool, a flossing tool or a sensor for detecting an oral health problem, such as gingivitis, plaque or calculus. It will be appreciated that this list is not considered to be exhaustive, and the device 100 may, in other examples, comprise another type of device.

The oral care device 100 comprises a head portion 102. The head portion has a protuberance 104 for engaging an interproximal region within an oral cavity. In some examples, the device 100 may include a handle portion 106. The handle portion 106 may include or form a housing for containing one or more components of the oral care device 100. For example, such a housing may house a drive mechanism, such as a drive train for causing movement (e.g. vibration or rotation) of at least part of the head portion 102. In some examples, the housing may include a power source, such as a battery. The housing may, in some examples, include one or more of the components of the device 100 disclosed herein.

The oral care device 100 comprises at least one sensor 108 for acquiring motion data for the oral care device. The at least one sensor 108 may be located in (e.g. within the housing), or on the device 100. In some examples, the at least one sensor 108 may be located within or on the handle portion 106 of the device 100 while, in other examples, the at least one sensor may be located within or on the head portion 102 of the device. In examples in which multiple sensors 108 are included, one or more sensors may be located within or on the handle portion 106 of the device 100 and one or more sensors may be located within or on the head portion 102 of the device.

Examples of the types of sensor 108 that may be included in the device 100 are discussed below. In general, however, the at least one sensor 108 may comprise any type of sensor capable of obtaining or acquiring motion data for the oral care device 100 (i.e. data representative of the motion of the device). In various examples, the at least one sensor may comprise one or more of the following (in any combination): an accelerometer, a gyroscope, a proximity sensor, a magnetometer, an optical sensor and an inertial measurement unit (IMU).

As noted above, the at least one sensor 108 of the device 101 may comprise one or more sensors of various types. In some embodiments, the at least one sensor 108 may comprise at least one of an accelerometer, an orientation sensor and a proximity sensor. In some embodiments, two or more sensors may be included, the sensors being selected from those mentioned herein or other types of sensors.

In some embodiments, the at least one sensor 108 may comprise an accelerometer. The processor 110 may be configured to integrate acceleration data from the accelerometer over time to obtain velocity data. The processor 110 may further be configured to determine when the protuberance engages an interproximal region by detecting a minimum in the velocity data. Thus, the accelerometer may output data describing the acceleration of the accelerometer in three dimensions. The accelerometer may be located within the handle portion 106 or the head portion 102 of the device 100. Since the geometry of the device 100 is known, the acceleration of the head portion 102 of the device may be determined regardless of where in the device the accelerometer is located. In some embodiments, sensors 108 such as accelerometers may be located in the handle portion 106 and the head portion 102 of the device 100.

The oral care device 100 also comprises a processor 110. The processor 110 may, in some examples, be located within or on the device 100, or may be connected to the device, for example by a wired or wireless connection. The processor 110 may be located within or on the handle portion 106 of the device 100, or within or on the head portion 102 of the device. The processor 110 may be in operative communication with the at least one sensor 108, so as to receive and processor data from the at least one sensor. In some examples, the processor 110 may be in operative communication with one or more other components of the device 100. For example, the processor 110 may operate a power supply and/or a drive mechanism of the device 100.

The processor 110 is further configured to determine when the protuberance 104 of the head portion 102 engages an interproximal region 206 in the oral cavity. As discussed below, determining engagement with an interproximal region may be achieved in a number of ways. In general, though, knowing when the protuberance engages an interproximal region means that information regarding the position of the device 100 (or at least the head portion 102 of the device) can be more easily determined.

The processor 110 is also configured to determine, based on motion data acquired by the at least one sensor 108 as the protuberance 104 moves between interproximal regions, a position of the head portion 102 of the oral care device in the oral cavity. In some examples, the determination of the position may be made in real time as the device 100 is moved around the oral cavity and, in particular, between the interproximal regions. In other examples, the determination of the position may be made after an oral care activity has been completed. For example, motion data may be stored in a memory, and the processor 110 may be configured to determine when the protuberance engaged an interproximal region during the oral care activity, and also determine the position of the head portion of the device 100 in the oral cavity, based on the stored data.

By using motion of the device 100 between interproximal regions, the position can be determined accurately without the need for cameras. Furthermore, the ability to accurately determine the position of the device 100 within a user's oral cavity means that the user's oral health may be improved. For example, if the device 100 is used for detecting oral health problems, then the precise location of any detected problems can be determined. Similarly, if the device 100 is used for oral cleaning or treatment, then it is possible to determine whether or not a particular region within the oral cavity has been adequately treated. As a consequence, the oral health of the user may be greatly improved.

Figure 2:
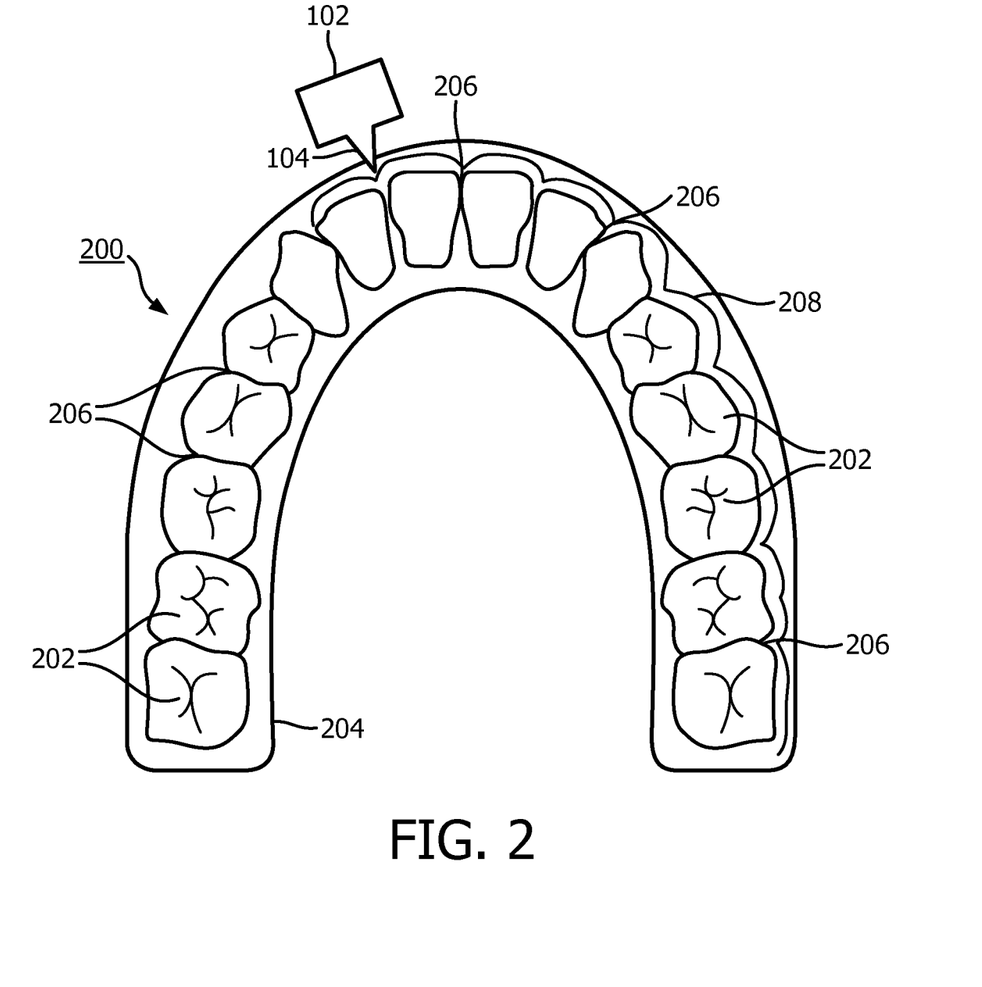
FIG. 2 is a representation of part of an oral care device and a dental arch of a user.

FIG. 2 is a representation of the head portion 102 of an oral care device, such as the device 100, and a dental arch 200 of a user. The dental arch 200 includes teeth 202 and a gum 204. Interproximal regions 206 are shown between adjacent teeth 202. In use, the protuberance 104 of the head portion 102 of the device 100 extends towards the teeth 202.

As noted above, the device 100 could take many different forms. In general, however, the protuberance 104 is configured such that, in use, it engages with the interproximal regions 206 within the oral cavity. In some examples, the device 100 may be moved around the dental arch in a path indicated by the line 208, which generally follows the contours of the teeth. Thus, the protuberance 104 may at least partially enter an interproximal region 206 as it is moved between the teeth 202. In other examples, the protuberance 104 may not enter the interproximal regions 206, but may have another mechanism for enabling the processor 110 to determine when the protuberance is located at (e.g. engaging) an interproximal region.

Figure 3:
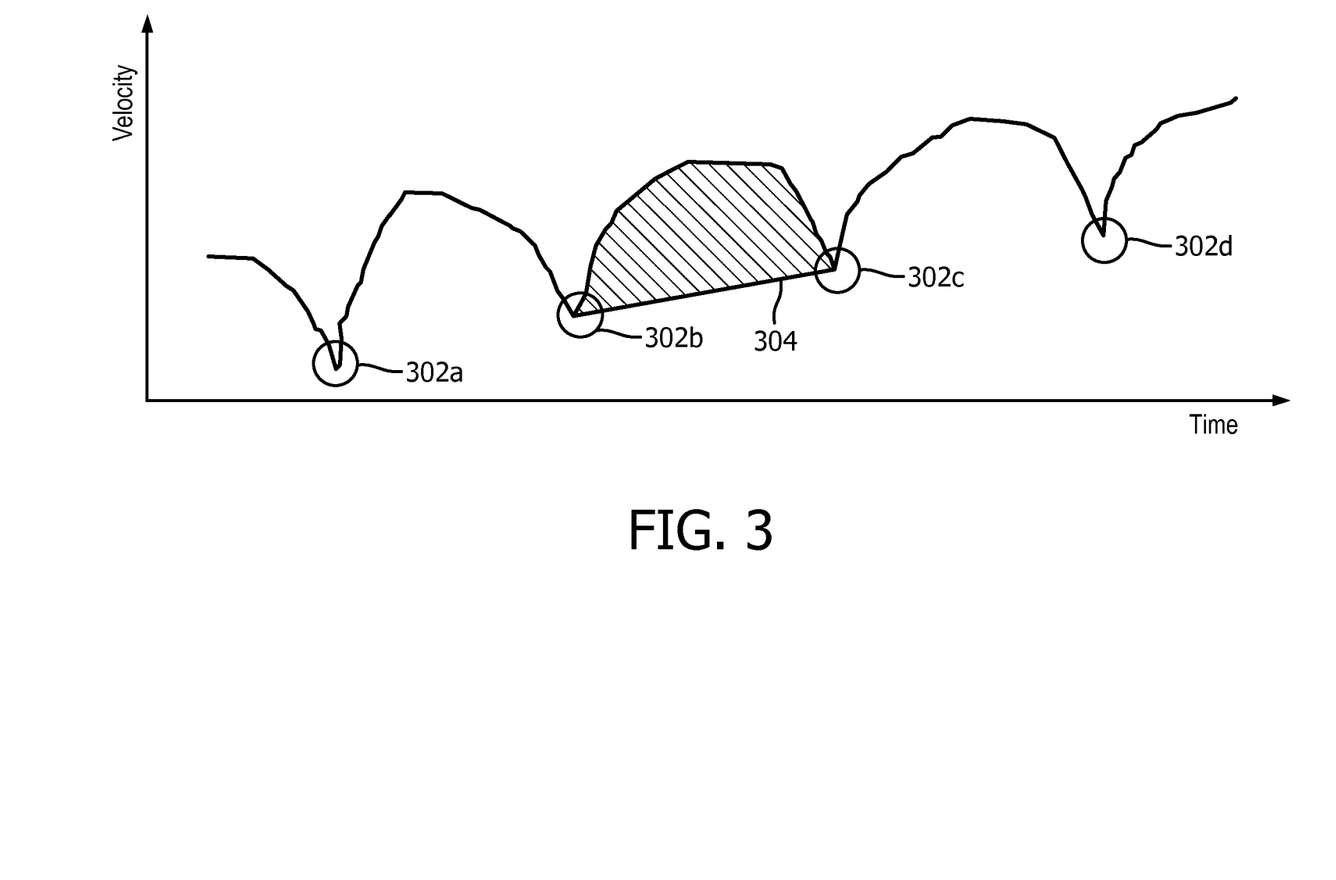
FIG. 3 is a graph showing the velocity or movement of an oral care device over time.

As the head portion 102 moves from one interproximal region 206 to another, around the surfaces of the teeth 202, the acceleration measured by an accelerometer sensor 108 changes. By integrating the measured acceleration over time, it is possible to obtain data showing how the velocity of the accelerometer sensor 108 changes over time. In such an integration, compensation may be made for the gravitational acceleration component. FIG. 3 is a graph 300 showing the velocity of movement of the accelerometer sensor 108 of the oral care device 100 over time. For clarity, the velocity represented in the graph 300 has been reduced to one dimension, but it will be apparent that a similar representation of the velocity may be obtained from a consideration of the velocity in three dimensions. Each minimum 302$a$, 302$b$, 302$c$, 302$d$ in the graph 300 is representative of the protuberance 104 engaging an interproximal region 206. According to the graph 300, as the protuberance 104 is moved out of the interproximal region 206, the velocity of the movement of the head portion 102 increases rapidly, before reaching a maximum, and then decreasing as the protuberance moves into the next interproximal region.

In some embodiments, the head portion 102 of the device 100 may be approximately stationary while the protuberance 104 is positioned in (i.e. engages with) each interproximal region 206. For example, the device 100 may comprise an oral cleaning device which projects a jet of air and/or water into interproximal regions 206 between teeth 202. Such a device may be held relatively stationary when in a suitable position (i.e. when the protuberance 104 engages an interproximal region. Thus, the velocity calculated from the acceleration data output by the accelerometer might be expected to fall to zero while the device is held still relative to the user's head. However, a non-zero velocity may be calculated, for example, if the user is moving while using the device (e.g. if the device and the user's head are moving together but not relative to one another), or as a result of sensor drift. The minima 302$a$ to 302$d$ in the graph 300 increase over time and have non-zero values, but each minimum may be recognized as a temporary pause in motion resulting from the protuberance 104 engaging an interproximal region 206.

In some embodiments, the processor 110 may be configured to calculate a distance between interproximal regions 206 by integrating the velocity data over time to obtain a distance moved by the protuberance 104 between interproximal regions. For example, using the data shown in the graph 300 of FIG. 3, the area between the velocity curve and a base line 304 drawn between adjacent minima 302$b$ and 302$c$ may be integrated to obtain the distance moved between the adjacent interproximal regions corresponding to the minima 302$b$ and 302$c$. In FIG. 3, this area is hatched.

In addition to the acceleration/velocity data, three-dimensional data regarding the shape of the teeth 202 and the dental arch 200 may be acquired. Since the outer surface of a molar is generally flat, whereas the surface of a canine is generally curved, analysis of the data may provide a further insight as to which tooth the device is passing. This may improve the position determination.

Data describing the distance moved by the protuberance 104 as the head portion 102 of the device 100 is moved within an oral cavity (e.g. around the dental arch 200 as shown by line 208 in FIG. 2) may be used in a number of ways. In one example, distances between adjacent interproximal regions 206 may be calculated and, based on the pattern of distances, a determination may be made regarding which tooth 202 each distance corresponds to. For example, an upper dental arch of a human might typically include 16 teeth, with incisors at the front, then, moving towards the back, canines, premolars and molars. Each type of tooth may have a typical size relative to its adjacent tooth or teeth and, therefore, once two or three distances between adjacent interproximal regions 206 have been calculated, it may be possible to determine which teeth the protuberance 104 has moved over. Some users may have one or more teeth missing and, therefore, determining the position of the head portion 102 of the device may require additional data, such as accelerometer data as the head portion is moved over more teeth. However, with data from enough interproximal regions, it may be possible to determine the position of the protuberance 104 within the oral cavity. In another example, the calculated distance between a pair of adjacent interproximal regions 206 may be recorded and compared at a later date with the distance measured at some later time. If the measured distance is unchanged over time, then it may be concluded that the user complied with their habitual oral treatment routine. However, if the distance between two interproximal regions 206 changes over time, then it may be determined that the user has missed treatment of a particular interproximal region, which may lead to the development of an oral health issue in that area. In some examples, data acquired by the at least one sensor 108 may be stored in a storage medium (e.g. a memory) for use in a comparison at some later time. In some embodiments, if the compared distance changes by more than a defined amount over a defined period of time, then an alert signal may be generated by the processor 110. Such an alert signal may include a warning to be presented to the user and/or a warning message to be transmitted to a dental professional. Such a warning may help the user to identify the early onset of an oral health issue, such as gingivitis.

In some of the above examples, the at least one sensor 108 includes an accelerometer. However, in other embodiments, one or more other sensors may be included in addition to or instead of an accelerometer. In some embodiments, the at least one sensor 108 may comprise an orientation sensor for determining an orientation of the oral care device relative to the head of the user. For example, in some embodiments, the orientation sensor may comprise a gyroscope. The processor 110 may be configured to determine the position of the head portion 102 of the oral care device 100 based on the determined orientation. For example, when using an oral care device, such as a cleaning device which projects a jet of air and/or water into interproximal regions 206 of a user's mouth, a user might typically hold the device in a substantially upright (e.g. vertical) orientation while treating the teeth (and/or interproximal regions) towards the front of their mouth, but might typically hold the device in a substantially horizontal orientation while treating the teeth (and/or interproximal regions) towards the back of their mouth. An orientation sensor within the device may determine an approximate angle relative to the horizontal or vertical at which the device is being held and, from that data, an approximate position of the protuberance 104 of the device may be determined. In some embodiments, data from an orientation sensor may be combined with data from one or more other sensors (e.g. an accelerometer) to enable the determination of the position of the head portion 102 to be made more accurately.

Referring again to FIG. 2, the line 208 represents a path followed by the protuberance 104 of the head portion 102 of the device 100 as it is moved between the interproximal regions 206. While the exact shape and size of a dental arch and number of teeth 202 may vary from person to person, each dental arch may have generally the same shape and size. Thus, as the protuberance 104 is moved over the teeth 202 of a user around the dental arch 200, it may follow a general arch-shaped path 208. As the protuberance 104 engages each interproximal regions 206, the protuberance 104 may be displaced slightly from the general arch-shaped path. For example, the protuberance 104 may temporarily move in a direction substantially perpendicular to the arch-shaped path, as shown by the line 208 in FIG. 2. Thus, in some embodiments, the processor 110 may be configured to determine, from the motion data, a general path around a dental arch within the oral cavity. The processor 110 may be configured to determine when the protuberance 104 engages and interproximal region 206 by detecting movement of the head portion 102 in a direction substantially perpendicular to the general path. In some embodiments, the data regarding the motion of the head portion in a direction which is substantially perpendicular to the general path followed by the head portion may be used in addition to other motion data, such as data acquired by an accelerometer and/or an orientation sensor, as described above.

Figure 4:
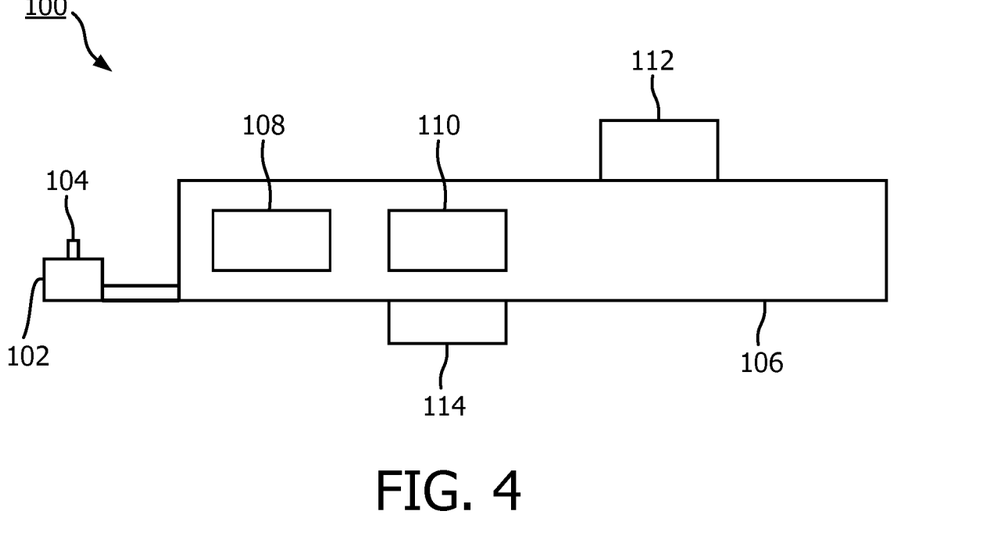
FIG. 4 is a simplified schematic of a further example of an oral care device.

So far, methods for determining that the protuberance 104 has engaged an interproximal region 206 have included the automatic determination based on data acquired by one or more sensors 108 in the device 100. In some embodiments, however, a user may provide an indication to the device 100 when the protuberance 104 is positioned in an interproximal region 206. FIG. 4 is a simplified schematic of an example of an oral care device 100, which may comprise, or be similar to, the oral care device 100 shown in FIG. 1. The oral care device 100 may comprise a user input mechanism 112. In some embodiments, the user input mechanism 112 may comprise a button or a switch which can be actuated by a user operating the device. For example, a user may press the button 112 each time they have positioned the head portion 102 of the device such that the protuberance 104 engages and interproximal region 206. Pressing the button 112 may cause a signal to be sent from the button to the processor 110. The processor may use methods described herein to determine the distance between interproximal regions 206. More particularly, the processor 110 may be configured to determine that the protuberance 104 of the head portion 102 has engaged an interproximal region 206 based on the receipt of a user input via the user input mechanism 112. Such a user input mechanism 112 may be included, for example, on an oral cleaning device which projects a jet of air and/or water into the interproximal regions 206 of a user's mouth. The user input mechanism 112 may be configured to receive a user input when the user intends for the jet of fluid to the projected from the device. Typically, the fluid jet may be projected while the device is stationary and while the protuberance 104 is positioned in or adjacent to an interproximal region 206. Therefore, the processor 110 may be configured to treat the receipt of a user input via the user input mechanism 112 as an indication that the protuberance 104 has engaged an interproximal region 206.

The oral care device 100 may, in some embodiments, further comprise a detector 114 for detecting an oral health disorder. The detector may comprise any sensor or detector for detecting a health disorder manifesting itself in the oral cavity, or a particular oral health disorder, problem or disease. For example, the detector 114 may be configured to detect plaque, calculus, demineralization, caries, gum disease, tooth decay, gingivitis, or the like. The detector 114 may include one or more detection technologies such as optical, fluorescence and/or electrical arrangements. In some embodiments, the detector 114 may acquire data regarding the user's oral health, while the one or more sensors 108 are used to determine the position of the device 100 in use. In this way, if an oral health disorder or defect is detected by the detector 114, then the position of the detected disorder can be determined.

Figure 5:
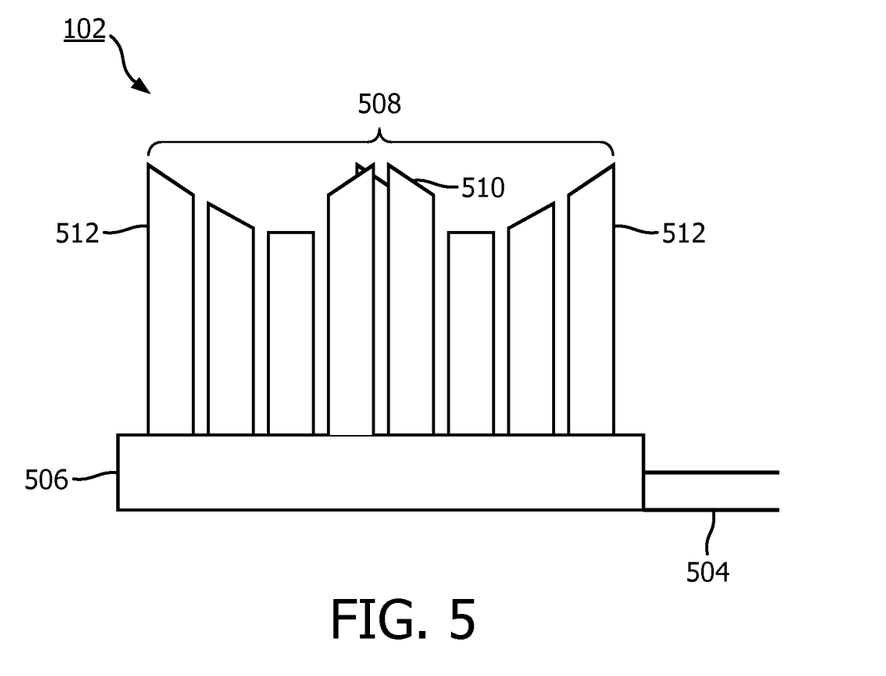
FIG. 5 is an illustration of an example of a head portion of an oral care device.
Figure 6:
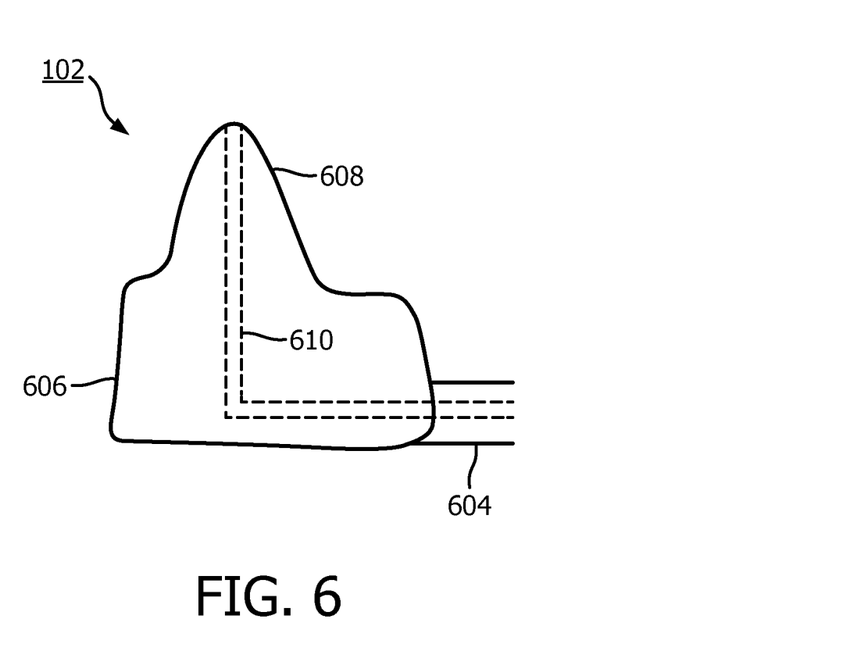
FIG. 6 is an illustration of a further example of a head portion of an oral care device.

As noted above, the oral care device 100, and particularly the head portion 102, may take many forms. In any embodiment, the head portion 102 includes a protuberance 104 which extends (i.e. stands proud) from the head portion such that it can engage an interproximal region 206 in a user's mouth. FIGS. 5 and 6 are illustrations of examples of types of head portions 102.

FIG. 5 is an illustration of an example of a head portion 102 of a toothbrush. The head portion 102 includes a neck portion 504, which may be configured to connect to, or fit on, a handle portion 106 of the device 100. The head portion 102 may include a bristle support 506 configured to hold and support a plurality of tufts of bristles 508. In the embodiment shown in FIG. 5, the toothbrush head portion 102 includes bristle tufts 508 having a plurality of different sizes. A central tuft (or plurality of tufts) 510 extends outwards from the bristle support 506 further than the bristles or tufts of bristles that immediately surround it. In other words, the central bristles 510 are longer than that bristles immediately surrounding them. In this way, the central tuft 510 comprises the protuberance 104. As the toothbrush head portion 102 is moved around the user's dental arch, the central tuft 510 of bristles is caused to engage the interproximal regions 206. As the central tuft 510 engages an interproximal region, the user may feel a sensation (e.g. hear a sound and/or feeling a "notching" sensation). This sensation may cause the user to pause, or slow down the speed of movement of the brush each time the central tuft 510 engages an interproximal region 206. In some examples, the user may be requested or instructed to pause each time he or she feels the central tuft 510 engage an interproximal region.

In other words, the oral care device 100 may, in some embodiments, comprise a toothbrush, the head portion 102 of the toothbrush comprising a plurality of bristles 508. The protuberance 104 may comprise an extended tuft 510 of bristles amongst the plurality of bristles 508.

In some embodiments, the bristles of the central tuft 510 may be tilted relative to the other bristles. In other embodiments, other tuft arrangements may be used. In general, however, the arrangement of bristles is such that a user is able to receive tactile feedback as one or more of the bristles or tufts engage the interproximal regions. This may encourage the user to "step" over the teeth, rather than continuously sweeping over the teeth without pausing. The arrangement of the bristles 508 may, in some embodiments, be such that bristles at the ends (e.g. the front and back) of the head portion 102 are extended relative to (e.g. longer than) other bristles 508. For example, as shown in FIG. 5, end bristles (or tufts) 512 may extend to substantially the same length as the central tuft 510. With this arrangement, in use, the end bristles/tufts 512 may also engage interproximal regions 206. Specifically, as the central tuft 510 engages a first interproximal region 206, the end tufts 512 may engage the second and third interproximal regions either side of the first interproximal region, respectively. In this way, the tactile feedback experienced by the user may be enhanced.

In an alternative embodiment, the device 100 may comprise an oral cleaning device in which a jet of fluid (e.g. gas and/or water) is projected towards a region (e.g. an interproximal region) in an oral cavity. FIG. 6 is an illustration of an example of a head portion 102 of an oral cleaning device that projects a jet of fluid. The head portion 102 includes a neck portion 604, which may be configured to connect to, or fit on, a handle portion 106 of the device 100. The head portion 102 may include a support portion 606, and a nozzle 608. A channel 610 (shown as a dashed line) may be formed through the nozzle 608, the support portion 606 and the neck portion 604. The channel 610 may be in fluid communication with a fluid reservoir (not shown), and may be configured to allow fluid to flow therethrough, so as to be ejected from the nozzle 608 towards a target in the oral cavity. In use, the user may position the head portion 102 such that the nozzle engages (e.g. is within) an interproximal region 206. A jet of fluid may then be caused (e.g. automatically or in response to a user input) to flow from the nozzle 608 towards the interproximal region 206. In this way, the user may move the head portion 102 of the device 100 around their mouth, but may pause each time the nozzle 608 engages an interproximal region 206. As noted above, a jet of fluid may be ejected automatically, or the user may actuate the fluid ejection, for example by pressing a button (e.g. the user input mechanism 112).

Thus, according to some embodiments, the oral care device 100 may comprise an oral cleaning device configured to direct a flow of fluid from a nozzle 608 of the head portion 102 towards an interproximal region 206. The protuberance 104 may comprise the nozzle 608.

Figure 7:
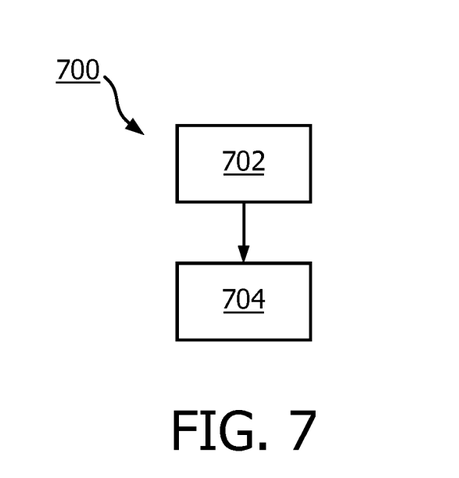
FIG. 7 is a flowchart of an example of a method of determining the location of an oral care device.

In addition to an oral care device 100, an aspect of the disclosure also relates to a method. FIG. 7 is a flowchart of an example of a method 700 of determining a position of an oral care device 100 in an oral cavity, the oral care device having a head portion 102 which includes a protuberance 104 for engaging an interproximal region within the oral cavity, and at least one sensor 108 for acquiring motion data for the oral care device. The method 700 comprises, at step 702, determining when the protuberance 104 of the head portion 102 engages an interproximal region in the oral cavity. For example, the determination of step 702 may be made using any of the techniques described herein. At step 704, the method 700 comprises determining, based on motion data acquired by the at least one sensor 108 as the protuberance 104 moves between interproximal regions, a position of the head portion 102 of the oral care device 100 in the oral cavity. The position of the head portion 102 of the device 100 may be determined using any of the techniques described herein.

Figure 8:
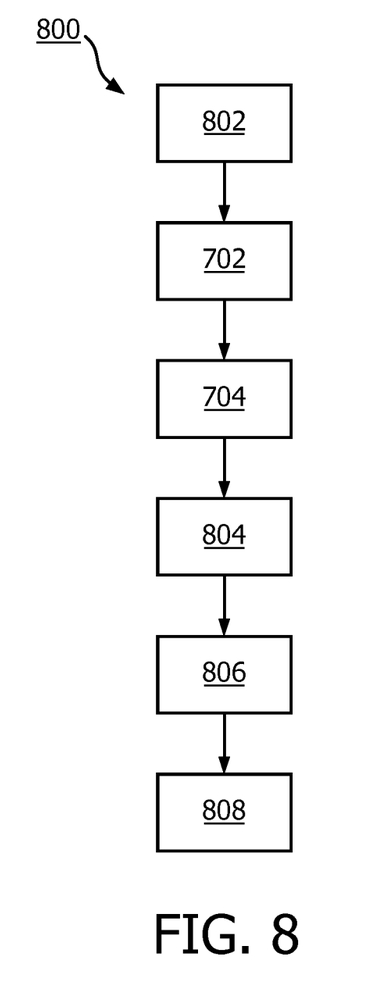
FIG. 8 is a flowchart of a further example of a method of determining the location of an oral care device.

FIG. 8 is a flowchart of a further example of a method 800 of determining a position of an oral care device 100. Steps of the method 800 may be performed in certain embodiments. The method 800 includes the steps 702 and 704 described above. However, in some embodiments, prior to determining when the protuberance 104 of the head portion 102 engages an interproximal region, the method 800 may comprise, at step 802, applying a statistical model to the motion data. For example, in some embodiments, a Hidden Markov Model and/or a Kalman filter may be applied to the data. Applying such a statistical model may help to filter the data, thereby making the position determination (at step 704) more robust to disturbances, such as head movement. Some statistical models may rely on the presumption that a user generally moves an oral cleaning device sequentially from tooth to tooth. Therefore, based on knowledge of the current location of the device 100 a prediction may be made regarding a position into which the device will likely be moved next. In some embodiments, the robustness of the position determination may be further improved by requesting or instructing the user to begin the oral care activity at a particular location within the oral cavity, such as the interproximal region between the user's two upper front teeth.

The method 800 may further comprise, at step 804, calculating a distance between interproximal regions 206. The calculation may be made using any of the techniques discussed herein. For example, if acceleration data is acquired using the at least one sensor 108, then the acceleration data may be integrated twice with respect to time to obtain a measure of the distance travelled by the device, such as the distance between interproximal regions. At step 806, the method 800 may comprise comparing the calculated distant between interproximal regions 206 with a previously-calculated distance between the same interproximal regions. Thus, in some embodiments, data acquired by the at least one sensor 108 may be stored, for example in a storage medium associated with the device (e.g. a memory in the device, or remotely from the device, such as in the 'cloud'). Previously-acquired data may be compared with newly-acquired data so as to determine whether the calculated distance has changed over time. The method 800 may comprise, at step 808, generating an alert signal if it is determined that the compared distances differ by more than a threshold amount. If the distance between a particular pair of adjacent interproximal regions 206 has changed over time, then this may be indicative of movement of teeth, inflammation of the gum, or of some other oral health issue. Thus, if a significant (i.e. above a threshold) change in the calculated distance is detected, then a signal may be generated (e.g. by a processor associate with the device 100) (step 808). The signal may be delivered, for example, to the user, visually via a display, or audibly via a speaker, and/or to a medical or dental professional.

Figure 9:
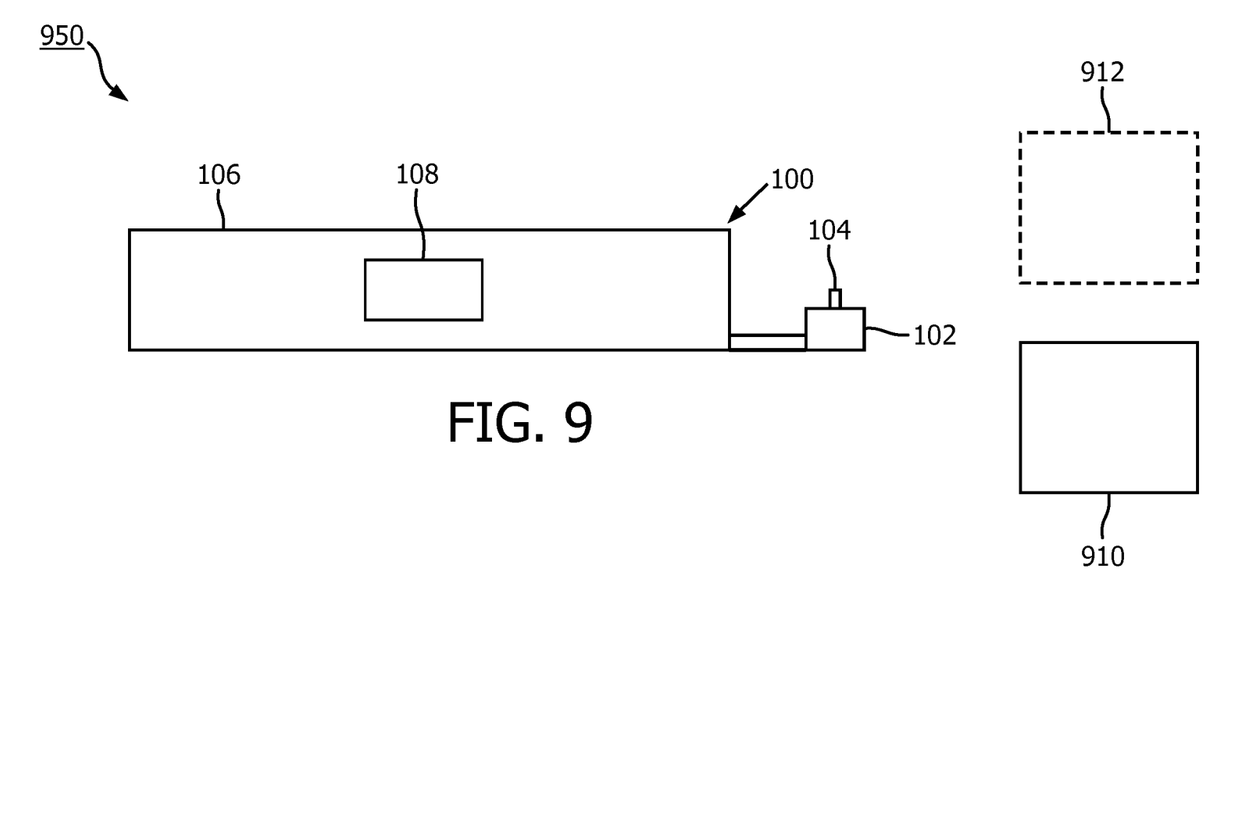
FIG. 9 is a simplified schematic of an example of a system for determining the location of an oral care device.

According to a further aspect, an oral care system is also disclosed. FIG. 9 is a simplified schematic of an oral care system 950. The oral care system 950 comprises an oral care device 100 and processing circuitry 910. The oral care device 100 comprises a head portion 102 which includes a protuberance 104 for engaging an interproximal region 206 within an oral cavity. The oral care device 100 may also include a handle portion 106. The oral care device 100 also includes at least one sensor 108 for acquiring motion data for the oral care device. The processing circuitry 910 is configured to determine when the protuberance 104 of the head portion 102 engages an interproximal region 206 in the oral cavity. The processing circuitry 910 is also configured to determine, based on motion data acquired by the at least one sensor as the protuberance 104 moves between interproximal regions 206, a position of the head portion 102 of the oral care device 100 in the oral cavity.

In some embodiments, the processing circuitry 910 may be located remotely from the oral care device 100. For example, the processing circuitry 910 may comprise a processor in a computing device, such a smartphone, tablet computer, laptop computer, desktop computer, wearable device, smart mirror or the like. In some embodiments, the processing circuitry 910 may be located in a server or in a cloud-based computing environment. In such examples, the processing circuitry 910 may communicate with the oral care device 100 (e.g. with transmitting circuitry and/or one or more processors within the oral care device) wirelessly.

In use, a user may operate the oral care device 100 in the manner described herein. The oral care device 100 may communicate with the processing circuitry 910, for example by transmitting motion data acquired by the device to the processing circuitry. The processing circuitry 910 may then perform processing, for example the processing steps discussed above. In some examples, the processing circuitry 910 may be configured to perform one or more steps of the method disclosed herein.

By using processing circuitry 910 located remotely from the oral care device 100, a device of lower cost may be used, as the data processing may be performed by a dedicated processor in a computing device, for example, rather than by a processor in the device itself.

In some embodiments, the oral care system 950 may further comprise a motion detector 912 for measuring movement of the head of the user relative to the oral care device 100. The dashed line in FIG. 9 indicates that the motion detector 912 is optional. The processing circuitry 910 may be configured to calculate the distance between adjacent interproximal regions 206 based at least in part on the measured movement. The motion detector 912 may, in some embodiments, comprise an optical sensor, such as a camera. In other embodiments, the motion detector 912 may comprise a light detector, a radar detector, a lidar detector, a laser detector, an ultrasound detector, a capacitance detector, a proximity detector, or the like. The motion detector may be located on the oral care device 100 itself, or remote from the oral care device, for example in a computing device. Thus, in addition to determining a position of the head portion of the device, the processing circuitry may also calculate a distance between interproximal regions. By basing this calculation on the measured movement of the user's head relative to the oral care device, the distance calculation may be more accurate. For example, the oral care device may move due to the user moving (e.g. walking) while using the device. This movement may be detected by the at least one sensor of the device. However, this movement can be disregarded if it can be determined that the movement (or at least a portion of the movement) can be attributed to the user moving their head and the device, rather than the device being moved relative to the head.

Thus, embodiments disclosed herein provide a mechanism by which the position of an oral care device can be determined based on its positioning in interproximal regions of an oral cavity during use. Determining a position in this way avoids the need for high resolution camera devices which may be considered to be an invasion of privacy.

The processor 110, 910 can comprise one or more processors, processing units, multi-core processors or modules that are configured or programmed to control the device 100, in the manner described herein. In particular implementations, the processor 110, 910 can comprise a plurality of software and/or hardware modules that are each configured to perform, or are for performing, individual or multiple steps of the method described herein.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An oral care device comprising:
   a head portion having a protuberance for engaging an interproximal region in a dental arch within an oral cavity;
   at least one sensor for acquiring motion data for the oral care device; and
   a processor configured to:
      determine when the protuberance of the head portion engages an interproximal region in the oral cavity by detecting a pause in motion of the head portion along the dental arch; and
      determine, based on motion data acquired by the at least one sensor as the protuberance moves between interproximal regions, a position of the head portion of the oral care device in the oral cavity.

2. An oral care device according to claim 1, wherein the at least one sensor comprises at least one of an accelerometer, an orientation sensor and a proximity sensor.

3. An oral care device according to claim 1, wherein the at least one sensor comprises an accelerometer, and wherein the processor is configured to:
   integrate acceleration data from the accelerometer over time to obtain velocity data; and
   determine when the protuberance engages an interproximal region by detecting a minimum in the velocity data.

4. An oral care device according to claim 3, wherein the processor is configured to:
   calculate a distance between interproximal regions by integrating the velocity data over time to obtain a distance moved by the protuberance between interproximal regions.

5. An oral care device according to claim 1, wherein the at least one sensor comprises an orientation sensor for determining an orientation of the oral care device relative to the head of the user; and wherein the processor is configured to:
   determine the position of the head portion of the oral care device based on the determined orientation.

6. An oral care device according to claim 1, wherein the processor is configured to:
   determine, from the motion data, a general path around a dental arch within the oral cavity; and
   wherein the processor is configured to determine when the protuberance engages an interproximal region by detecting movement of the head portion in a direction substantially perpendicular to the general path.

7. An oral care device according to claim 1, further comprising:
   a detector for detecting an oral health disorder.

8. An oral care device according to claim 1, wherein the oral care device comprises a toothbrush, the head portion of the toothbrush comprising a plurality of bristles;
   wherein the protuberance comprises an extended tuft of bristles amongst the plurality of bristles.

9. An oral care device according to claim 1, wherein the oral care device comprises an oral cleaning device configured to direct a flow of fluid from a nozzle of the head portion towards an interproximal region;
   wherein the protuberance comprises the nozzle.

10. An oral care device comprising:
    a head portion having a protuberance for engaging an interproximal region within an oral cavity;
    at least one sensor for acquiring motion data for the oral care device; and a processor configured to:
  determine when the protuberance of the head portion engages an interproximal region in the oral cavity;
  determine, based on motion data acquired by the at least one sensor as the protuberance moves between interproximal regions, a position of the head portion of the oral care device in the oral cavity; and
a user input mechanism;
wherein the processor is configured to determine that the protuberance of the head portion has engaged an interproximal region based on a user input received from the user input mechanism.

11. A method of determining a position of an oral care device along a dental arch in an oral cavity, the oral care device having a head portion which includes a protuberance for engaging an interproximal region within the oral cavity, and at least one sensor for acquiring motion data for the oral care device, the method comprising:
  determining when the protuberance of the head portion engages an interproximal region in the oral cavity by detecting a pause in motion of the head portion along the dental arch; and
  determining, based on motion data acquired by the at least one sensor as the protuberance moves between interproximal regions, a position of the head portion of the oral care device in the oral cavity.

12. A method according to claim 11, further comprising:
  applying a statistical model to the motion data prior to determining that the protuberance of the head portion has engaged an interproximal region.

13. A method of determining a position of an oral care device in an oral cavity, the oral care device having a head portion which includes a protuberance for engaging an interproximal region within the oral cavity, and at least one sensor for acquiring motion data for the oral care device, the method comprising:
  determining when the protuberance of the head portion engages an interproximal region in the oral cavity;
  determining, based on motion data acquired by the at least one sensor as the protuberance moves between interproximal regions, a position of the head portion of the oral care device in the oral cavity;
  calculating a distance between interproximal regions;
  comparing the calculated distance between interproximal regions with a previously-calculated distance between the same interproximal regions; and
  generating an alert signal if it is determined that the compared distances differ by more than a threshold amount.

14. An oral care system comprising:
an oral care device including:
  a head portion which includes a protuberance for engaging an interproximal region in a dental arch within an oral cavity; and
  at least one sensor for acquiring motion data for the oral care device; and
processing circuitry configured to:
  determine when the protuberance of the head portion engages an interproximal region in the oral cavity by detecting a pause in motion of the head portion along the dental arch; and
  determine, based on motion data acquired by the at least one sensor as the protuberance moves between interproximal regions, a position of the head portion of the oral care device in the oral cavity.

15. An oral care system according to claim 14, further comprising:
  a motion detector for measuring movement of the head of the user relative to the oral care device;
  wherein the processing circuitry is configured to calculate a distance between adjacent interproximal regions based at least in part on the measured movement.

* * * * *